(12) United States Patent
Chatelus (10) Patent No.: US 8,791,649 B2
(45) Date of Patent: Jul. 29, 2014

(54) METHOD OF SETTING UP A LUMINAIRE AND LUMINAIRE TO APPLY THE METHOD

(75) Inventor: Bertrand Chatelus, Villefontaine (FR)

(73) Assignee: Koninklijke Philips N.V., Eindhoven (NL)

( * ) Notice: Subject to any disclaimer, the term of this patent is extended or adjusted under 35 U.S.C. 154(b) by 818 days.

(21) Appl. No.: 13/054,098

(22) PCT Filed: Jul. 16, 2009

(86) PCT No.: PCT/IB2009/053092
§ 371 (c)(1),
(2), (4) Date: Jan. 14, 2011

(87) PCT Pub. No.: WO2010/010493
PCT Pub. Date: Jan. 28, 2010

(65) Prior Publication Data
US 2011/0115384 A1 May 19, 2011

(30) Foreign Application Priority Data

Jul. 21, 2008 (EP) .................................... 08300240

(51) Int. Cl.
*G05F 1/00* (2006.01)
*H05B 37/02* (2006.01)
*H05B 39/04* (2006.01)
*H05B 41/36* (2006.01)
*G08B 1/08* (2006.01)

(52) U.S. Cl.
USPC ........................................ 315/294; 340/539.1

(58) Field of Classification Search
None
See application file for complete search history.

(56) References Cited

U.S. PATENT DOCUMENTS

| 6,548,967 | B1 | 4/2003 | Dowling et al. |
| 8,049,434 | B2 * | 11/2011 | Crouse et al. ................. 315/291 |
| 8,300,577 | B2 * | 10/2012 | Simons et al. ................. 370/328 |
| 2003/0232598 | A1 | 12/2003 | Aljadeff et al. |

FOREIGN PATENT DOCUMENTS

| EP | 1251721 A1 | 10/2002 |
| EP | 1408276 A2 | 4/2004 |
| WO | 0197466 A1 | 12/2001 |
| WO | 03098977 A1 | 11/2003 |
| WO | 2004100617 A1 | 11/2004 |
| WO | 2006095316 A1 | 9/2006 |
| WO | 2006095317 A1 | 9/2006 |
| WO | 2006136985 A1 | 12/2006 |
| WO | 2007102112 A1 | 9/2007 |
| WO | 2007102114 A1 | 9/2007 |
| WO | 2008012721 A2 | 1/2008 |

* cited by examiner

*Primary Examiner* — Douglas W Owens
*Assistant Examiner* — Dedei K Hammond
(74) *Attorney, Agent, or Firm* — Yuliyia Mathis (57) ABSTRACT

A method of setting up a luminaire, said luminaire being part of a network of luminaires and each luminaire of said network of luminaires being a node of a wireless communication network, comprises, for said luminaire: receiving (S32) signals from neighboring luminaires; generating (S34) indicators from the received signals, wherein indicators give respectively indications of distances between the neighboring luminaires and said luminaire; ranking (S35) at least a part of the neighboring luminaires according to their respective indicators; providing (S36) a lighting scenario for said ranked neighboring luminaires depending on their respective ranks.

13 Claims, 5 Drawing Sheets

|  | L1 | | L2 | | L3 | | L4 | | L5 | | L6 | |
|---|---|---|---|---|---|---|---|---|---|---|---|---|
| rank | luminaire n° | level | luminaire n° | level | luminaire n° | level | luminaire n° | level | luminaire n° | level | luminaire n° | level |
| 1 | 2 | 90 | 1 | 90 | 2 | 90 | 3 | 90 | 4 | 90 | 5 | 90 |
| 2 | 3 | 80 | 3 | 90 | 4 | 90 | 5 | 90 | 6 | 90 | 4 | 80 |
| 3 | 4 | 70 | 4 | 80 | 1 | 80 | 2 | 80 | 3 | 80 | 3 | 70 |
| 4 | 5 | 60 | 5 | 70 | 5 | 80 | 6 | 80 | 2 | 70 | 2 | 60 |
| 5 | 6 | 50 | 6 | 60 | 6 | 70 | 1 | 70 | 1 | 60 | 1 | 50 |

FIG. 6

METHOD OF SETTING UP A LUMINAIRE AND LUMINAIRE TO APPLY THE METHOD

FIELD OF THE INVENTION

The invention relates to the set up of a network of luminaires.

More specifically, the invention relates to networks of outdoor luminaires, such as networks of luminaires to be set up in residential places.

BACKGROUND OF THE INVENTION

In the search for energy saving, a trend in public lighting and more generally to area lighting, is to use intelligent lighting system, i.e. system which dims down the light when nobody is in the area and to switch automatically to full power when a pedestrian is approaching. The man skilled in the art understands that an intelligent lighting system saves cost and energy, especially for municipalities, by lighting the area only when necessary.

A classical intelligent lighting system comprises a network of luminaires, a system of presence detectors for detecting anyone (car, pedestrian, biker, etc) in the street, and a central electronic unit for controlling/coordinating the power supply of the luminaires according to the events detected by the detectors.

The communication between the central electronic unit and the luminaires may use a wireless communication network in which each luminaire is a node of the network. Therefore, the spatial structures of the lighting array and communication network are equivalent.

After an installation of an intelligent lighting system, it is necessary to commission each luminaire. Classically, it is a manual step in which each luminaire is identified in the network and for the control unit and an addressing address is assigned to it.

Thus, after commissioning, there is a perfect isomorphism between the wireless network and the lighting array, each luminaire having its known wireless node and reciprocally.

However, a significant disadvantage is that the commissioning process is time consuming for the installer. For instance, the commissioning electrician must selectively actuate luminaires or groups of luminaires and allocate them some addresses.

To overcome the disadvantage of a manual commissioning process, it has been proposed to use Received Signal Strength Indication (RSSI) or Time-of-Flight techniques to discover the wireless network spatial topography and, knowing the spatial topography of luminaires, to map the wireless network onto the luminaire network.

For instance, patent application WO 01/97 466 discloses a method to determine a wireless network configuration by using a range between stations computed from the signal strength of the transceivers involved in the connection and a central controlling unit to control nodes in the network, method which may be used for an automatic commissioning process.

However, these types of range measurement might be subject to error and, hence, the derived position of the communication nodes often do not match exactly to positions on the grid or lattice arrangement on which the luminaire are arranged. There is, therefore, uncertainties as to which luminaire each node is associated with.

Therefore, complex computing algorithms are used to correct the errors.

Consequently, the discovering method of the wireless network spatial topography and the error correction to map it onto the luminaires network requires some intensive computing process and is not error-prone.

SUMMARY OF THE INVENTION

It would be advantageous to achieve an automatic initializing process for an intelligent lighting system which is easy to use, do not necessitate intensive computation and is error-prone.

To better address one or more concerns, in a first aspect of the invention, a method of setting up a luminaire, said luminaire being part of a network of luminaires and each luminaire of said network of luminaires being a node of a wireless communication network, comprises, for said luminaire:
  receiving signals from neighbouring luminaires;
  generating indicators from the received signals, wherein indicators give respectively indications of distances between the neighbouring luminaires and said luminaire;
  ranking at least a part of the neighbouring luminaires according to their respective indicators;
  providing a lighting scenario for said ranked neighbouring luminaires depending on their respective ranks.

The method is advantageously decentralized. Each luminaire is autonomous to determine its environment.

In particular embodiments:
  the lighting scenario is arranged for being triggered in response to the detection of an event;
  each signal received during the step of receiving signals comprises an identifier of the corresponding neighbouring luminaire, and the step of generating indicators is processed from the received energies of said signals;

In another aspect of the invention, a method of managing the light of a network of luminaires comprising a luminaire which is set up according to the hereabove method, comprises:
  detecting an event,
  generating a corresponding detection signal, and
  triggering the lighting scenario in response to the detection signal.

In another aspect of the invention, a luminaire of a network of luminaires comprises:
  a transceiver for transmitting and receiving a signal to/from a neighbouring luminaire;
  processing means connected to the transceiver, for generating an indicator of the distance between the neighbouring luminaire and the luminaire, from the signal received from said neighbouring luminaire;
  means for ranking the said neighbouring luminaire among a list of other neighbouring luminaires, depending on the value of the generated indicator;
  a storage for storing a lighting scenario which depends on the rank given to neighbouring luminaires.

In particular embodiments:
  the lighting scenario comprises a power scenario defining lighting powers of said luminaire and said neighbouring luminaires, the luminaire further comprising a power control device for adapting its own lighting power according to the power scenario;
  the transceiver is adapted to transmit and receive signal to/from a plurality of neighbouring luminaires, each signal comprising an identifier of the luminaire emitting said signal;
  the signal further comprises an identifier of the network of luminaires;

the lighting scenario defines one level of lighting for each neighbouring luminaire;

the level of power associated to each neighbouring luminaires is provided in the power scenario such that the higher the rank of this neighbouring luminaire, the lower the lighting power of the luminaire;

the luminaire further comprises means for, in response to a received detection signal emitted by an event detector having detected an event:

generating a signal towards each neighbouring luminaire to inform said neighbouring luminaire that an event has occurred; and transmitting each signal to the transceiver, said transceiver being adapted to transmit the signal to the neighbouring luminaires;

the power control device is further adapted to switch the lighting to full power when the detector detects an event.

said event detector is adapted to detect a presence in a lighting area of the luminaire.

said luminaire is able to receive a detection signal from a second event detector adapted to detect a presence in an area at a limit of the lighting area.

said luminaire comprises at least the said event detector;

the luminaire further comprises a controller for managing the lighting scenario once a determinate signal is received from another determinate luminaire or from a event detector associated with the determinate luminaire, so as to:

in the storage, read the lighting scenario corresponding to the determinate luminaire;

applying the lighting scenario read in step a.

In another aspect of the invention, a network of luminaires, comprising a plurality of hereabove luminaires, wherein each luminaire comprises means for applying the lighting scenario.

In a particular embodiment the network of luminaires further comprises a node comprising an event detector and a transceiver, said node being adapted to signal, via the transceiver, to at least one luminaire of the network, an event occurring in a certain volume of detection.

The network of luminaires is adapting its power consumption to the need of the environment. Therefore, there is energy and cost savings and these luminaires meet the eco-lighting market requirement for CO2 reduction.

This luminaires increase the user comfort and decrease the light pollution.

They are very easy to install: the system is completely autonomous, it is very easy to modify the installation.

The automatic addressing of messages avoids some typical problems of radio frequency communication.

The setting up of luminaires is resistant to error. Indeed, the distance ranking of neighbouring luminaires may contain some error, for instance a neighbouring luminaire is detected as nearer than a second neighbouring luminaire although it is the opposite in reality. However, the lighting scenario may be defined such that the service rendered by the luminaire is fulfilled despite the error.

The luminaires are adaptable to any configuration of luminaires network.

BRIEF DESCRIPTION OF THE DRAWINGS

These and other aspects of the invention will be apparent from and elucidated with reference to the embodiment described hereafter where.

DETAILED DESCRIPTION OF THE EMBODIMENT

Figure 1:
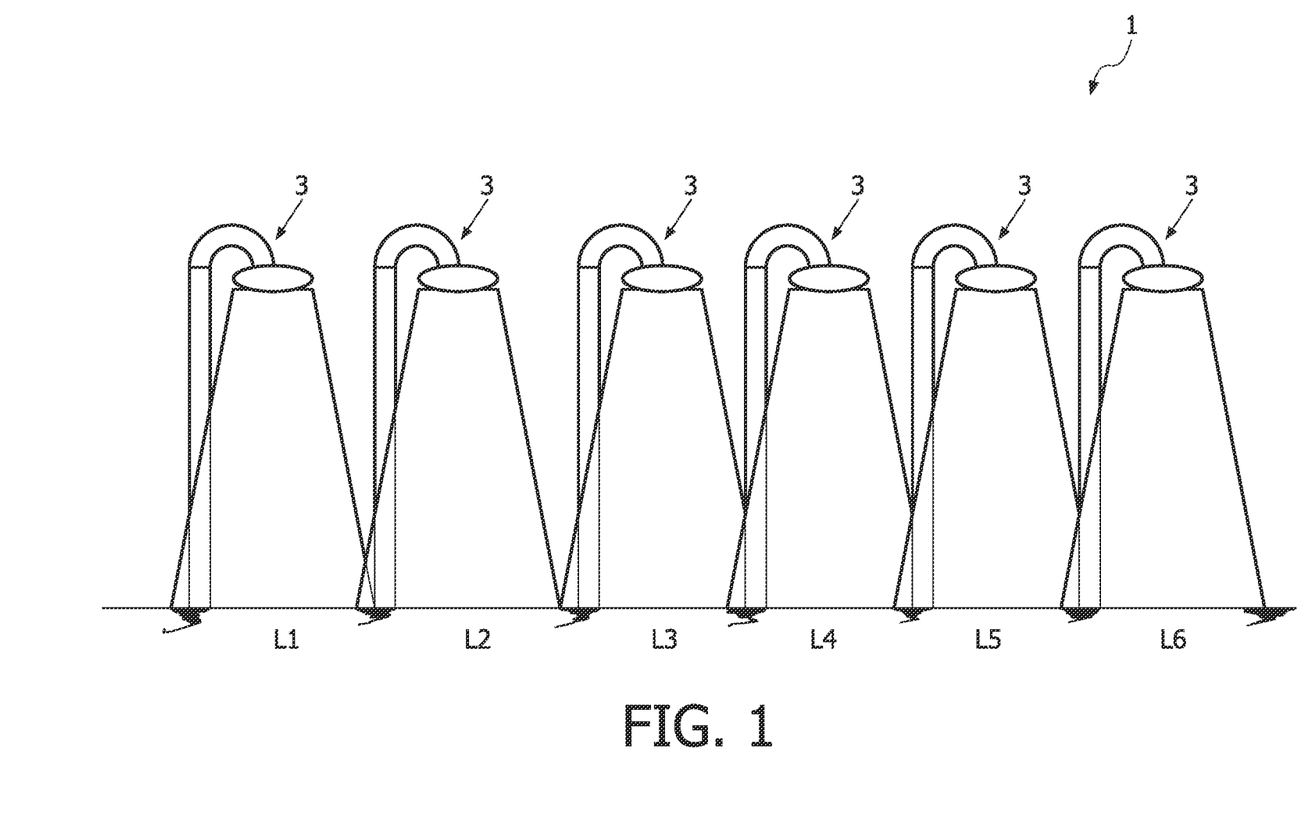
FIG. 1 is a schematic view of a luminaire network.

In reference to FIG. 1, a network of luminaires 1 is composed of 6 luminaires 3. Each luminaire is identified by an identifier L1, L2, L3, L4, L5 and L6 respectively. Each luminaire is dedicated to light a certain area. Possibly, areas of neighboured luminaires may overlap so as, for instance, to give a homogeneous light over the whole set of luminaires when they have all the same level of power.

Figure 2:
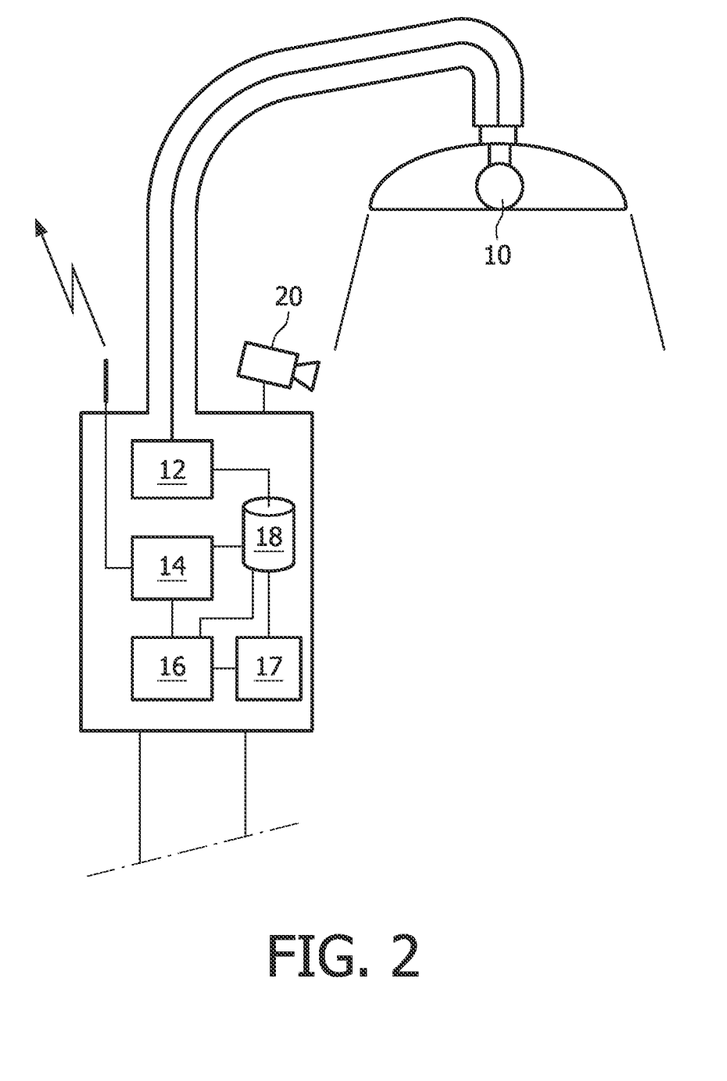
FIG. 2 is a schematic of a luminaire according to an embodiment.

Each one of these luminaires comprises, FIG. 2, a lighting source 10 controlled by a power control device 12. The power control device 12 is able to control the lighting power of the luminaire, for instance, from 0%, i.e. no light is emitted, to 100%, i.e. full lighting power of the lighting source 10, either continuously, either through predetermined steps, for instance 50%, 70%, 80% and 90% of the full lighting power.

The luminaire is part of an intelligent lighting network and, therefore, comprises a wireless transceiver 14 able to receive and transmit radio signals (or other kinds of signals, such as for example infrared or ultrasound signals) from/to other luminaires of the network of luminaires.

The luminaire further comprises processing means 16 connected to the transceiver 14. The processing means 16 generates an indicator of the distance between the neighbouring luminaires and the luminaire. The indicator may be the relative distance between the luminaire and any neighbouring luminaire of the network computed from the gain and/or amplitude of a signal received from this neighbouring luminaire using RSSI (Received Signal Strength Indication) well known from the man skilled in the art. Alternatively, the processing means 16 may use time-of-flight methods to determine the distance.

The luminaire comprises also means 17 for ranking the neighbouring luminaires depending on the value of the generated indicator. For instance, the neighbouring luminaires may be ranked from the nearest to the farthest based on their relative distance determined from the received signals.

The luminaire comprises storage 18 containing a lighting scenario defining relationships between the neighbouring luminaires and levels of lighting power. However, other kinds of lighting scenario, giving lighting effect (colour, diffusivity, lighting patterns or shape, etc.), might be implemented individually or in combination thereof.

For instance, the lighting scenario is a table of 2 columns and n lines, n being the number of neighbouring luminaires: the first column contains the luminaire identifiers and the second column the corresponding lighting effect defined, for instance, in percentage of the full lighting power.

The luminaire may also comprise an event detector 20. For instance, the event detector 20 is a sensor such as an infrared or microwave or visible camera able to detect motion. For instance, it is a CMOS or CCD camera. The event detector 20 is positioned to detect object/event nearby the luminaire. For instance, the event detector 20 is able to detect a person standing or walking in the lighting area of the luminaire. Alternatively the event detector 20 is not located in the luminaire but at another place, and communicates with the luminaire and possibly with other luminaires, especially when it detects an event.

Figure 3:
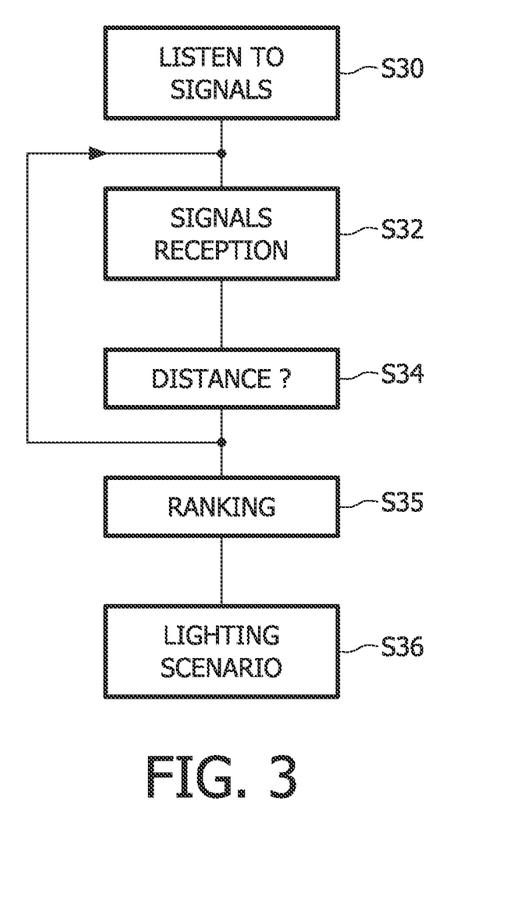
FIG. 3 is a flow chart of an initializing process according to an embodiment of the invention.

The luminaire is initialized as follows, FIG. 3.

During a preliminary step, for instance, during manufacturing, each luminaire receives a unique identifier and a network identifier. The network identifier is used to discriminate signals coming from luminaires members of the network from other signals. Therefore, each message transmitted by a luminaire contains at least the network identifier and the identifier of this luminaire. In some case, when there is only one luminaire network in an area, without interference, the network identifier may be suppressed as useless.

The luminaire listens at S30 to signals coming from neighbouring luminaires.

When the luminaire receives at S32 a signal coming from one neighbouring luminaire, the luminaire distance calculator determines at S34 the distance from the luminaire to this neighbouring luminaire.

Steps S32 and S34 are repeated until all relative distances to the neighbouring luminaires are determined.

Then at least a part of the neighbouring luminaires is ranked, at S35, according to their respective indicators. And, at S36, a lighting power is associated with each neighbouring luminaires and the association is stored. For instance, the luminaire contains a lighting scenario table prepared and stored during manufacturing of the luminaire. The table has the format explained here above. During manufacturing, a lighting power percentage has been stored on each row by considering that the first row refers to the nearest neighbouring luminaire, the second row to the second nearest neighbouring luminaire, etc. until the last row which refers to the farthest neighbouring luminaire. Alternatively, the luminaire comprises means for generating a lighting scenario according to determinate parameters, e.g. the calculated indicator values, some other parameters stored in the luminaire during manufacturing.

Figure 4A:
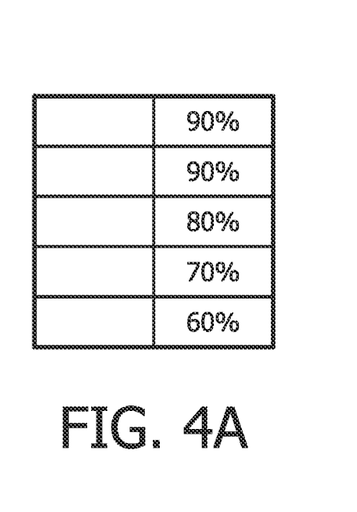
FIGS. 4A and 4B are lighting scenario tables.

FIG. 4A illustrates a lighting scenario table of the luminaire L3 of FIG. 1 at this stage.

Figure 4B:
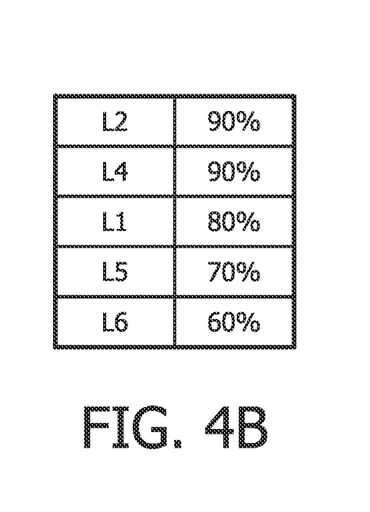

After having determined the distance of all neighbouring luminaires, they are sorted from the nearest to the farthest, for instance by the processing means 16. Then, the lighting scenario table is completed by inputting the identifier of the nearest luminaire in the corresponding field of the first row, and all the other rows until the corresponding field of the last row contains the farthest luminaire identifier. FIG. 4B illustrates the same lighting scenario table than those of FIG. 4A but completed by the luminaire identifiers.

The table is automatically completed during this initialization method. Therefore the person installing the luminaires has nothing to do to set up the luminaires, and particularly does not need to know the identifiers of each neighbouring luminaire.

Figure 5:
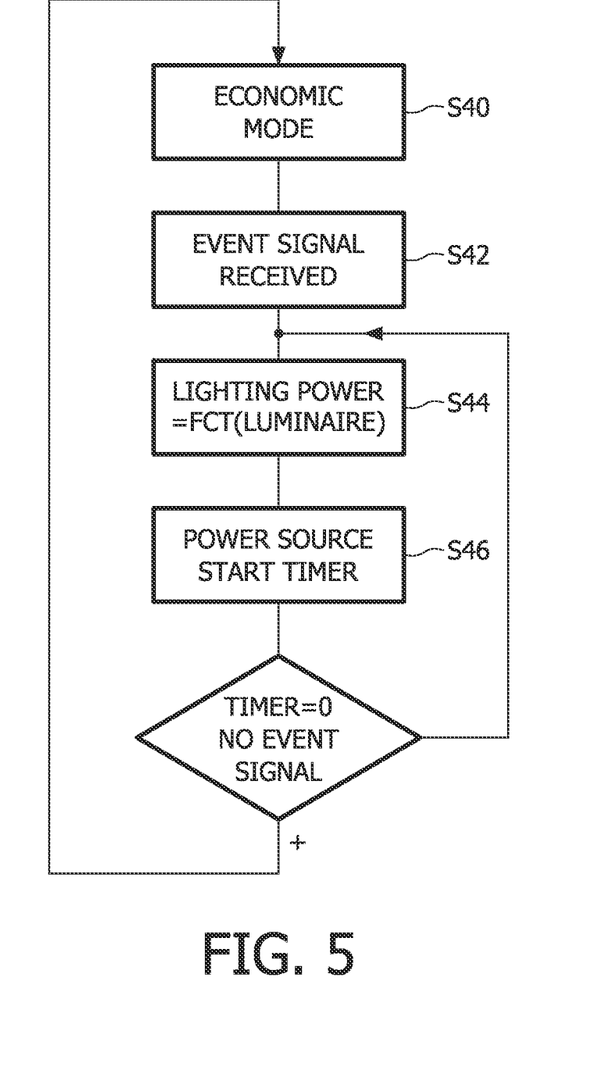
FIG. 5 is a flow chart of luminaire working method.

After initialization, the luminaire works as follows, and as depicted on FIG. 5.

The luminaire starts at S40 in an economic mode and listens to the neighbouring luminaires.

At S42, it receives a signal from a neighbouring luminaire or an event detector associated with a neighbouring luminaire, informing that an event has been detected proximate this neighbouring luminaire.

At S44, the luminaire reads its lighting scenario and determines the lighting power associated with this neighbouring luminaire.

At S46, the luminaire switches its lighting source to the determined lighting power and starts a timer for a predetermined delay.

At S48, if the predetermined delay has elapsed without receiving another event signal, the lighting source is switched to an economic mode. Otherwise, the reception of a new event signal resets the timer and the luminaire returns at the stage of S44 to determine the lighting power.

This process may be interrupted at any time by the detection of an event by the detector of the luminaire. Upon event detection, the luminaire switches its lighting source to full power and sends an event signal to the neighbouring luminaires. While the event is detected, the luminaire sends regularly event signals to inform the neighbouring luminaires that they must stay in their current lighting power. When no more events are detected, the luminaire returns to the economic mode, possibly after a predetermined delay determined for example by an embedded clock reset each time an event is detected.

Figure 6:
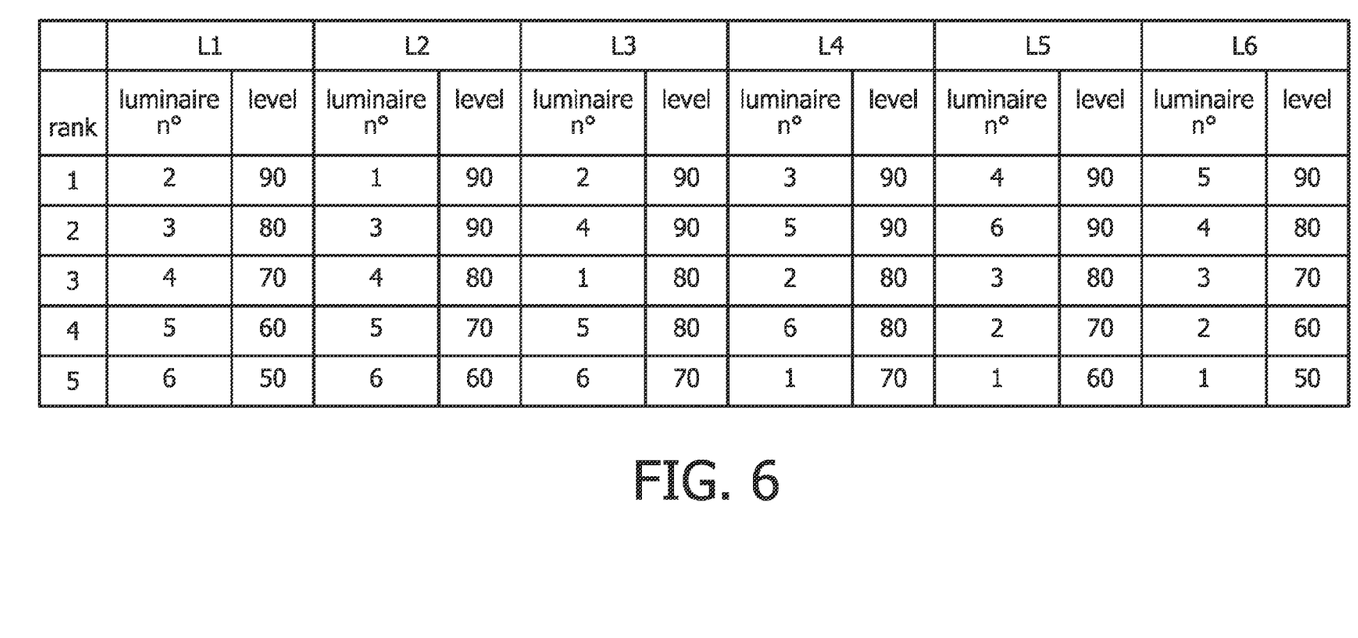
FIG. 6 is a compilation of lighting scenario tables of luminaires of FIG. 1.

To illustrate this process, FIG. 6 is a summary of all lighting scenario tables of the luminaires of FIG. 1.

When one luminaire broadcasts a message that it is seeing a user, it switches itself to full power. The neighbouring luminaires that see it in the top 2 closest luminaires, based on the lighting scenario tables, switches to 90%. The luminaires, which find it between position 3 and 5 of their table, switches to 60 to 80%. And, by default, the luminaires, which find it at a position above 6, stay in the economic mode.

In FIG. 6, the tables of the luminaires L1 and L6 which are at each end of the row are different of the other tables as the luminaire switches at 90% only for its nearest neighbouring luminaire. It is to take into account the particular position at the end of the row. Therefore, at installation, the lighting scenario table may be adapted to the geometry of the luminaire network without knowing the luminaire identifiers but only by considering the relative position of the luminaires.

In the embodiment of FIG. 6, the lighting scenarios are different depending on the position of the luminaire to show the flexibility of the disclosed method and luminaire. However, it is often sufficient to set up during manufacturing the same lighting scenario for all luminaires. Indeed, there is no difference for a user if the luminaires L1 and L6 uses the same table than luminaires L2 to L5, with the neighbouring luminaire ranked 2 implying a lighting power of 90% instead of 80%.

Another embodiment of the lighting scenario is to define the lighting power by relative distance, independently of the number of neighbouring luminaires. For instance, a lighting scenario may be:

For each neighbouring luminaires nearer than 50 meters, lighting power at 100%;

For each neighbouring luminaires between 50 and 300 meters, lighting power at 70%;

For each neighbouring luminaires farther than 300 meters, do not take them into account and stay in economic mode.

The man skilled in the art understands that, with this lighting scenario, an error on the relative distance has almost no significance for a user walking on the street lighted by the network of luminaires.

In an embodiment, the luminaires analyzes and determines the distance every time there is a communication. Thus, the lighting scenario tables may be adjusted at any time. This embodiment advantageously authorizes the replacement or the addition of a luminaire just by installing the new one, defining the right network identifier and storing its prepared lighting scenario. The other luminaires will add the new one in their tables as soon as they receive a message from it.

It may be useful to detect an event occurring outside the scope of the other event detectors of the luminaires, for instance, to anticipate the lighting of an area.

In an embodiment, the network of luminaires comprises also some specific nodes comprising only the transceiver to transmit signals to luminaires and/or at least an event detector. Therefore, the neighbouring luminaires record the presence and the distance of these nodes as for the other luminaires. If one of these nodes comprises an event detector it is located so as to be able to detect events occurred either in the lighting area of a determinate luminaire and is therefore associated with this determinate luminaire or in another area. The event detector detects an event and sends an event signal, the neighbouring luminaires are able to react according to their lighting scenario, depending on the determinate luminaire associated with the event detector or on a specific location allocated to the detector event in the lighting scenario table.

The network of luminaires may also include some luminaire not storing lighting scenarios, but only a switch or a series of switches for switching between different power levels, or no switch (keeping therefore the same level of power).

While the invention has been illustrated and described in details in the drawings and foregoing description, such illustration and description are to be considered illustrative or exemplary and not restrictive; the invention is not limited to the disclosed embodiment.

For instance, a remote control may easily be developed on the same model than the luminaire nodes to launch the initialization process.

The man skilled in the art understands that this disclosed embodiment may be integrated into an intelligent lighting system with a central control device to generate and/or receive general and/or maintenance command signals such as, for instance, a light-out signal emitted when natural light is sufficient, a repair request signal received from a luminaire to inform maintenance people, etc. The luminaire nodes behave as repeaters to transmit messages from the central control device to the whole network.

Other variations to the disclosed embodiments can be understood and effected by those skilled on the art in practicing the claimed invention, from a study of the drawings, the disclosure and the appended claims. In the claims, the word "comprising" does not exclude other elements and the indefinite article "a" or "an" does not exclude a plurality.

The invention claimed is:

1. Method of setting up a luminaire, said luminaire being part of a network of luminaires and each luminaire of said network of luminaires being a node of a wireless communication network, the method being implemented by and at luminaire and comprising:
   receiving signals from neighbouring luminaires;
   generating indicators from the received signals, wherein indicators give respectively indications of distances between the neighbouring luminaires and said luminaire;
   ranking at least a part of the neighbouring luminaires according to their respective indicators;
      providing a lighting scenario for said ranked neighbouring luminaires depending on their respective ranks, wherein the lighting scenario comprises a power scenario defining lighting powers of said luminaire and said neighbouring luminaires, the luminaire further comprising a power control device for adapting its own lighting power according to the power scenario, wherein the level of power associated to each neighbouring luminaires is provided in the power scenario such that the higher the rank of this neighbouring luminaire, the lower the lighting power of the luminaire; and
   storing the lighting scenario.

2. Method according to claim 1, wherein the lighting scenario is arranged for being triggered in response to the detection of an event.

3. Method according to claim 1, wherein
   each signal received during the step of receiving signals comprises an identifier of the corresponding neighbouring luminaire,
   the step of generating indicators is processed from the received energies of said signals.

4. Method of managing the light of a network of luminaires comprising a luminaire which is set up according to the method of claim 2, comprising:
   detecting the event,
   generating a corresponding detection signal, and
   triggering the lighting scenario in response to the detection signal.

5. A wireless lighting network comprising one or more luminaires comprising:
   a wireless transceiver for transmitting and receiving signals to/from at least one neighbouring luminaire;
   processing means connected to the transceiver, for generating indicators of the distances between the neighbouring luminaires and the luminaire, from the signal received from said neighbouring luminaires;
   means for ranking said neighbouring luminaires depending on the value of the generated indicator;
   means for providing a lighting scenario for said ranked neighbouring luminaires depending on their respective ranks, wherein the lighting scenario comprises a power scenario defining lighting powers of said luminaire and said neighbouring luminaires, the luminaire further comprising a power control device for adapting its own lighting power according to the power scenario, wherein the level of power associated to each neighbouring luminaires is provided in the power scenario such that the higher the rank of this neighbouring luminaire, the lower the lighting power of the luminaire; and
   a storage for storing the lighting scenario depending on the rank given to neighbouring luminaires.

6. Luminaire according to claim 5, wherein the transceiver is adapted to transmit and receive signal to/from a plurality of neighbouring luminaires, each signal comprising an identifier of the luminaire emitting said signal.

7. Luminaire according to claim 6, wherein the signal further comprises an identifier of the network of luminaires.

8. Luminaire according to claim 5, wherein the lighting scenario defines one level of lighting for each neighbouring luminaire.

9. Luminaire according to claim 5, wherein the luminaire further comprises means for, in response to a received detection signal emitted by an event detector having detected an event:
   a. generating a signal towards each neighbouring luminaire to inform said neighbouring luminaire that an event has occurred; and
   b. transmitting each signal to the transceiver, said transceiver being adapted to transmit the signal to the neighbouring luminaires.

10. Luminaire according to claim 9, wherein the lighting scenario comprises a power scenario defining lighting powers of said luminaire and said neighbouring luminaires, the luminaire further comprising a power control device for adapting its own lighting power according to the power scenario, and wherein the power control device is further adapted to switch the lighting to full power when the detector detects the event.

11. Luminaire according to claim 9, wherein said event detector is adapted to detect a presence in a lighting area of the luminaire.

12. Luminaire according to claim 11, wherein said luminaire is able to receive a detection signal from a second event detector adapted to detect a presence in an area at a limit of the lighting area.

13. Luminaire according to claim 11, wherein said luminaire comprises at least said event detector.

* * * * *